(12) United States Patent
Becker et al.

(10) Patent No.: US 6,168,079 B1
(45) Date of Patent: Jan. 2, 2001

(54) CUSTOMER INFORMATION TERMINAL SYSTEM WITH A DOCKING MEMBER FOR A DATA COLLECTION DEVICE

(75) Inventors: Robert J Becker, Richfield; Gregory R. Canda, Tallmadge; David B. Vanhorn, Columbia Station; Roger H. Ramsey, Akron, all of OH (US)

(73) Assignee: Telxon Corporation, Akron, OH (US)

( * ) Notice: Under 35 U.S.C. 154(b), the term of this patent shall be extended for 0 days.

(21) Appl. No.: 08/870,248

(22) Filed: Jun. 6, 1997

Related U.S. Application Data

(63) Continuation-in-part of application No. 08/668,343, filed on Jun. 26, 1996, now Pat. No. 5,821,512.

(51) Int. Cl.[7] .................................................. G06F 7/10
(52) U.S. Cl. ...................................... 235/383; 235/462.01
(58) Field of Search ................................... 235/432, 380, 235/382, 383, 382.5, 375, 379, 462.01, 472.01

(56) References Cited

U.S. PATENT DOCUMENTS

| | | | |
|---|---|---|---|
| 5,250,789 | 10/1993 | Johnsen | 235/383 |
| 5,295,064 | 3/1994 | Malec et al. | 235/383 |
| 5,382,779 | * 1/1995 | Gupta | 235/383 |
| 5,424,524 | 6/1995 | Ruppert et al. | 235/462 |
| 5,448,046 | * 9/1995 | Swartz | 235/432 |
| 5,484,991 | 1/1996 | Sherman et al. | 235/472 |

FOREIGN PATENT DOCUMENTS

| | | | |
|---|---|---|---|
| 0655717A2 | 5/1995 | (EP) | G07G 1/00 |
| PCT/US88/ 03432 | 10/1988 | (WO) | G06F 3/02 |
| PCT/US92/ 06992 | 8/1992 | (WO) | G07G 1/00 |
| PCT/US96/ 20497 | 12/1996 | (WO) | G06F 17/60 |
| PCT/US97/ 20845 | 11/1997 | (WO) | G06F 17/60 |

OTHER PUBLICATIONS

PCT International Search Report as compiled by European Patent Office, International Application No. PCT/US98/11366, International Filing Date: Jun. 3, 1998, and prior art documents cited therein.

* cited by examiner

Primary Examiner—Thien Minh Le
(74) Attorney, Agent, or Firm—Renner, Otto, Boiselle & Sklar, P.L.L.

(57) ABSTRACT

A customer information terminal system having a docking member for supporting a data collection device on a shopping cart, wall or the like. The docking member is dimensioned to receive the data collection device and allow for convenient storage thereof during and after use. The data collection device may take any number of forms, including a consumer assistant data terminal, a pen based data terminal, a scanning gun terminal or the like, and may communicate with a host computer system storing customer shopping data. The docking member may provide one or more degrees of movement, so that the data collection device may be situated in a convenient position. An interlock switch may also be provided to allow for the alternative selection of power sources. When the data collection device is located remote from the docking member, the interlock switch causes the device to be powered by an internal power source. When the data collection device is situated in the docking member the interlock switch causes the device to be powered by an external power source. In addition, the external power source can be used to charge the internal power source.

48 Claims, 13 Drawing Sheets

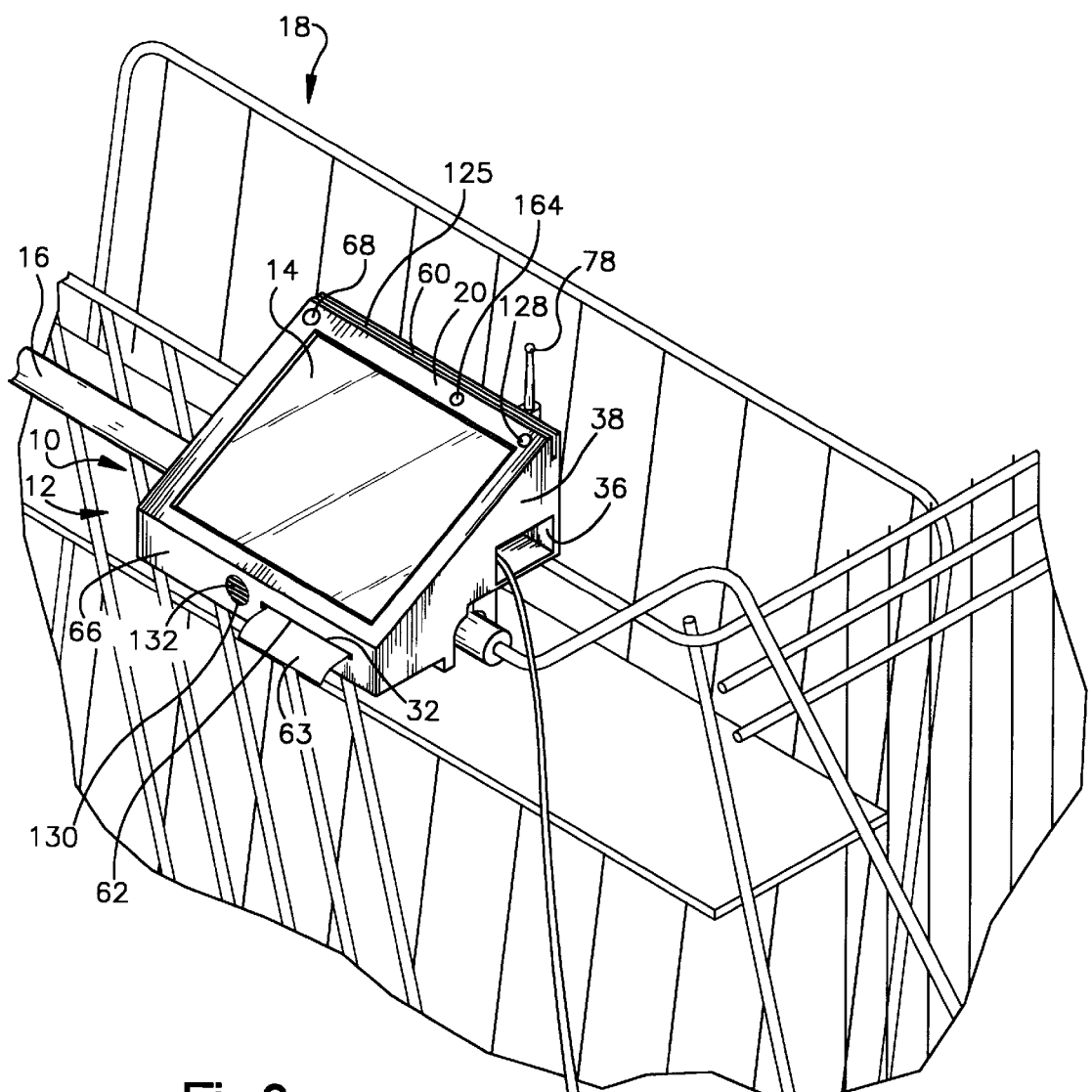
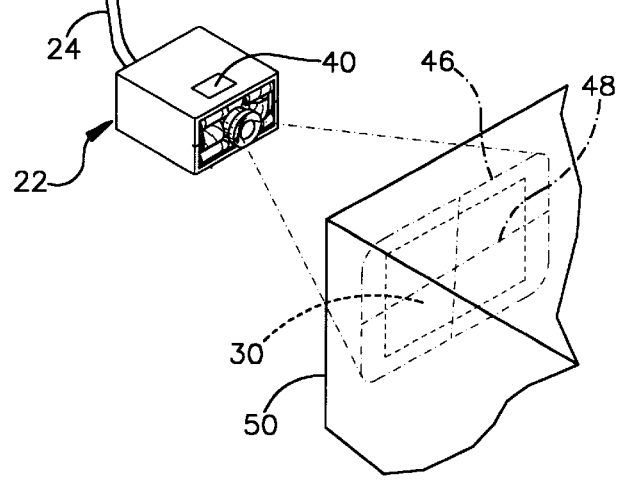
Fig.2

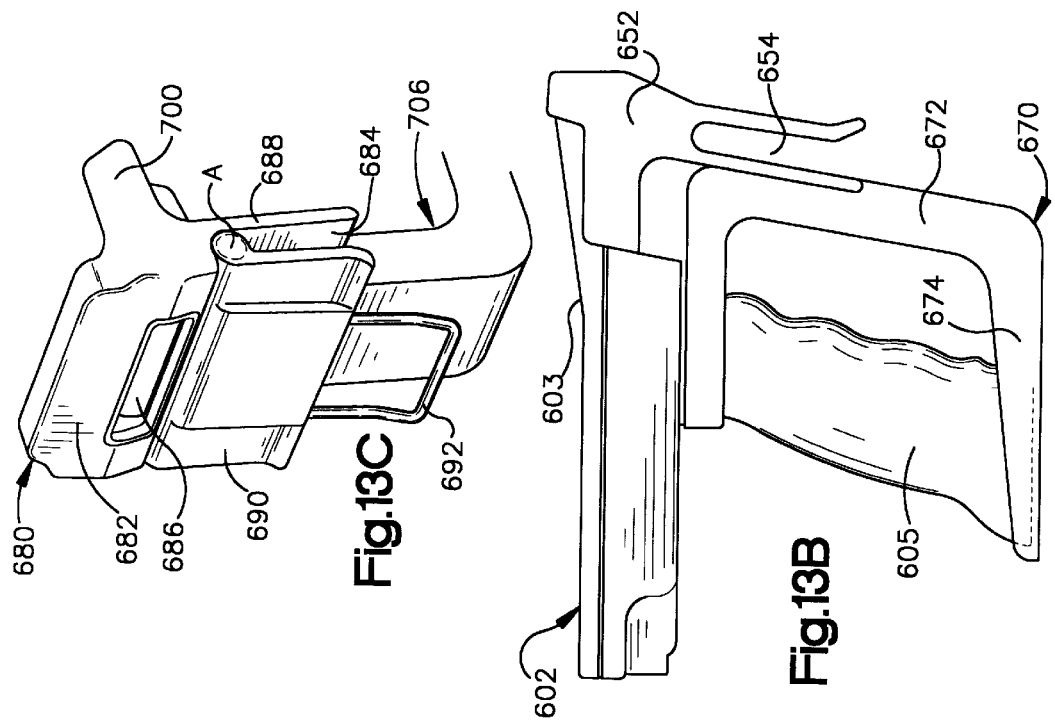
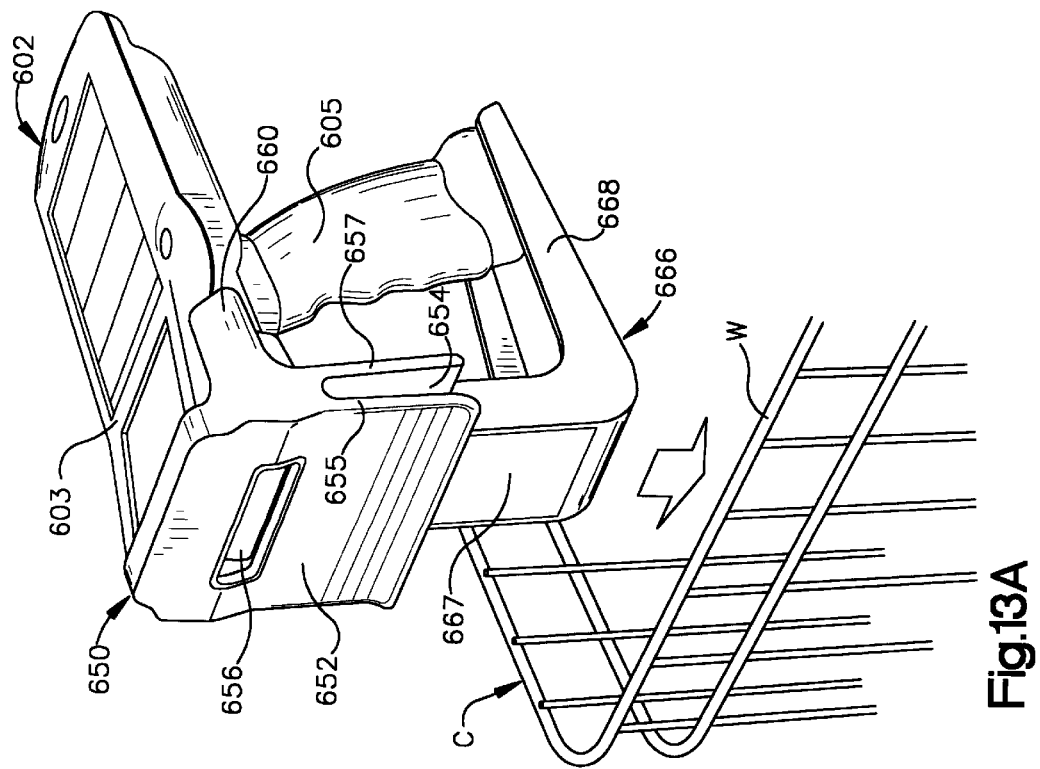

CUSTOMER INFORMATION TERMINAL SYSTEM WITH A DOCKING MEMBER FOR A DATA COLLECTION DEVICE

This application is a continuation-in-part of U.S. patent application Ser. No. 08/668,343 filed Jun. 26, 1996 now U.S. Pat. No. 5,821,512.

BACKGROUND OF THE INVENTION

Data collection devices, such as customer information terminals, consumer assistant terminals, pen-based data terminals, hand held scanners and the like, have been finding widespread use in a variety of applications. One recently popular application for data collection devices has been as a data collection device for consumers as they shop in a store. Typically, the data collection device is mounted to a shopping cart, and used to advertise products as the consumer shops, scan product codes to identify the price of a product, keep a running total of purchases, store shopping lists, assist a consumer in locating a desired product, and provide other helpful conveniences.

In recent years, several forces have been at work in the field of consumer retailing. First, strong competition between stores has led retailers to find new ways to attract and maintain customer loyalty. Consumers desire well-stocked convenient stores, fast service, low prices and high quality goods. In addition, manufacturers are seeking to reach targeted consumers with product advertising and coupons. Accordingly, the data collection device can help to serve the foregoing needs of retailers, consumers and manufacturers. The present invention provides means for mounting a data collection device to a cart, wall or the like, which enhances the convenience of the data collection device for both the consumer and the retailer. In addition, the present invention provides an improved system for providing power to the data collection device as it is alternatively used in remote and docked positions.

SUMMARY OF THE INVENTION

In accordance with the present invention, there is provided a customer information terminal system including a host computer for storing customer shopping data for a plurality of customers; a customer information terminal having a input means, a barcode reader, data communication means for communicating with the host computer, display means, and a mechanical coupling means for coupling the terminal to a docking support; a central docking area having a plurality of docking supports; and a plurality of shopping carts, each cart including support means for supporting the terminal on the shopping cart.

In accordance with another aspect of the present invention, there is provided a docking member for receiving a data collection device. The docking member includes mounting means for mounting the docking member to a support structure, such as a shopping cart or wall, and a support means for supporting the data collection device in a manner which allows for convenient remote use of the data collection device.

In accordance with another aspect of the present invention, there is provided an interlock switching system which allows for alternative sources of power to data collection device. An internal power source supplies power to the data collection device when it is used in a remote position, and an external power source supplies power to the data collection device when it is used in a docked position.

An advantage of the present invention is the provision of a customer information terminal system which provides communication between a host computer system, which stores customer shopping data, and a portable customer information terminal.

Another advantage of the present invention is the provision of a customer information terminal system including a plurality of docking members for supporting a customer information terminal, and for changing the source of power supplied to the customer information terminal.

Still another advantage of the present invention is the provision of a docking member for conveniently locating a data collection device on a support structure such as a cart, wall or the like.

Still another advantage of the present invention is the provision of a docking member for a data collection device, which allows the data collection device to be conveniently removed from a support structure for remote use or storage.

Still another advantage of the present invention is the provision of a docking member for a data collection device, which provides an easy, convenient and pleasant shopping experience.

Still another advantage of the present invention is the provision of a docking member for a data collection device, which allows store personnel to conveniently remove the data collection device from the cart before the consumer exits the store with the cart.

Yet another advantage of the present invention is the provision of an interlock switching system which automatically changes the source of power supplied to a data collection device, depending on whether the data collection device is being used from a remote position or a docked position.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 2 is a perspective view of a customer information terminal as mounted on the shopping cart with the dataform reader of the device being employed in a presentation mode;

FIG. 13A is a perspective view of a docking member for a data collection device according to still another embodiment of the present invention;

FIG. 13B is a side view of the docking member shown in FIG. 13A;

FIG. 13C is a perspective view of an alternative embodiment of the docking member shown in FIGS. 13A and 13B;

DETAILED DESCRIPTION OF THE PREFERRED EMBODIMENT

Figure 1:
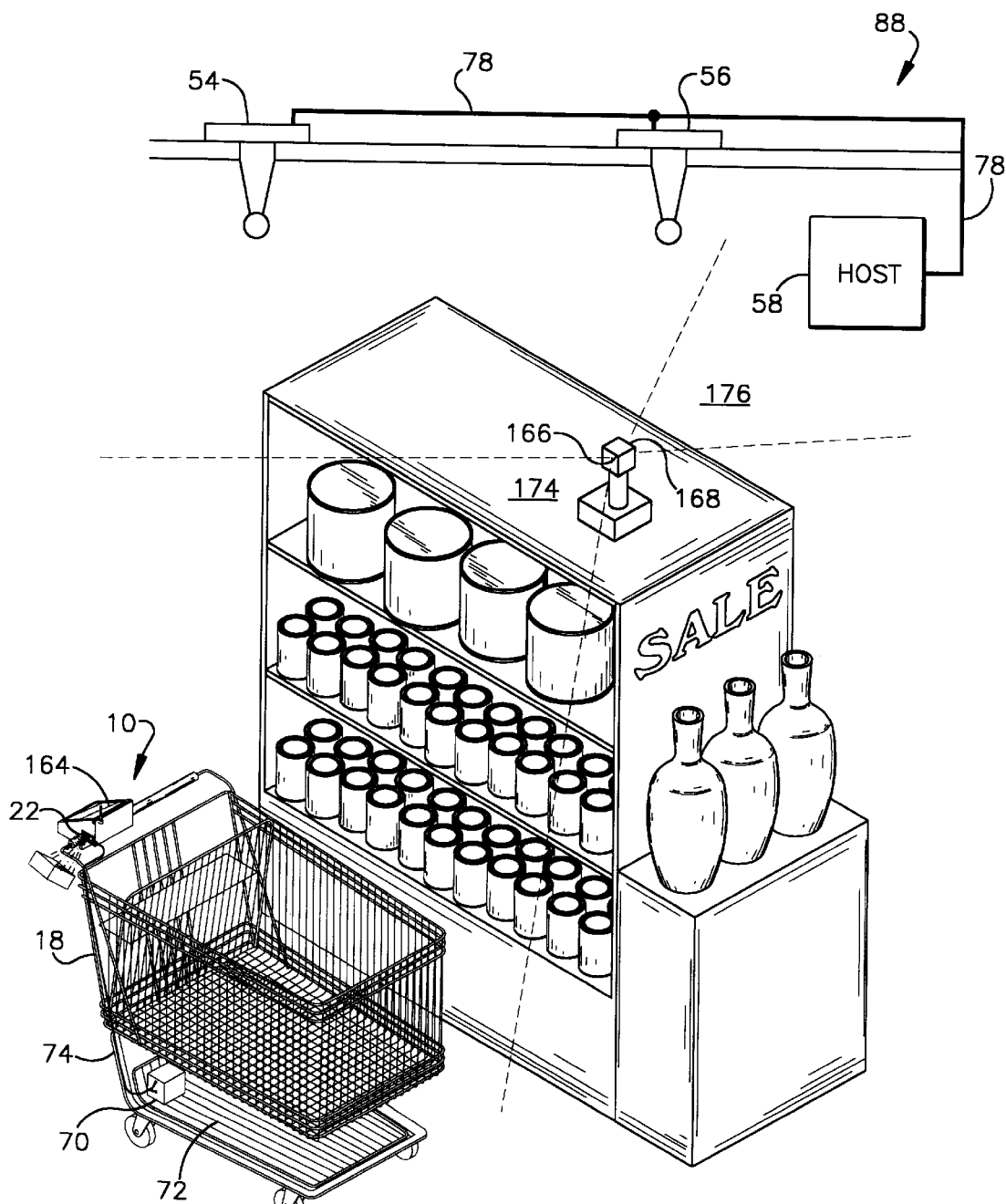
FIG. 1 is a perspective view of a portion of a retail store utilizing a customer information system in accordance with this invention.

Referring now to the drawings wherein the showings are for the purposes of illustrating a preferred embodiment of the invention only and not for purposes of limiting same, the customer information terminal system of this invention is represented in FIG. 1. The system generally comprises a customer information terminal 10 mounted on a shopping cart 18. The terminal is communicatively linked to a host computer by a wireless LAN 88. A transceiver in the terminal communicates with an transceiver in one of a plurality of access points 54 and 56, which, in turn, communicates with the host 58 via a hard wired network topology and network operating system ("NOS") suitably implemented on an Ethernet or token ring local area network ("LAN") 78. In the preferred embodiment, data communication between the shopping cart 18 and the LAN 88 is accomplished through a radio frequency (RF) link. However, it will be readily appreciated that any medium to short distance data communication scheme, such as infrared ("IR"), are suitably employed.

The customer terminal 10 generally functions as a TCP/IP web browser which alternatively link requests data at web sites stored at the host computer 58 and, after receiving the data, displays hyper-text mark-up language ("HTML") web pages to the customer on display 14. Using a HTML browser format advantageously provides flexibility on the particular hardware implemented in the customer terminal 10. For example, powerful HTML browsers exist under UNIX, WINDOWS, OS/2, and MACINTOSH environments. Thus, there is no need to engage in a costly design of a proprietary hardware system.

Web pages displayable on the terminal 10 advantageously provided, include information pertinent to the customer's shopping experience. The customer terminal 10 generates the link requests based on at least one of: (a) the current web page displayed to the customer, (b) a product identification code as read by dataform reader 22, (c) customer manual data input via interactive touch display screen 14, and (d) location in the store as determined by a transceiver 164. Although, as with the transceiver noted above, any suitable data transmission format may be used, the preferred embodiment employs an infrared IR receiver 164 detecting a unique signature data pattern transmitted by IR transceivers or transmitters 166 and 168 located at fixed locations in the store. Each of these systems will be discussed in more detail below.

Figure 5:
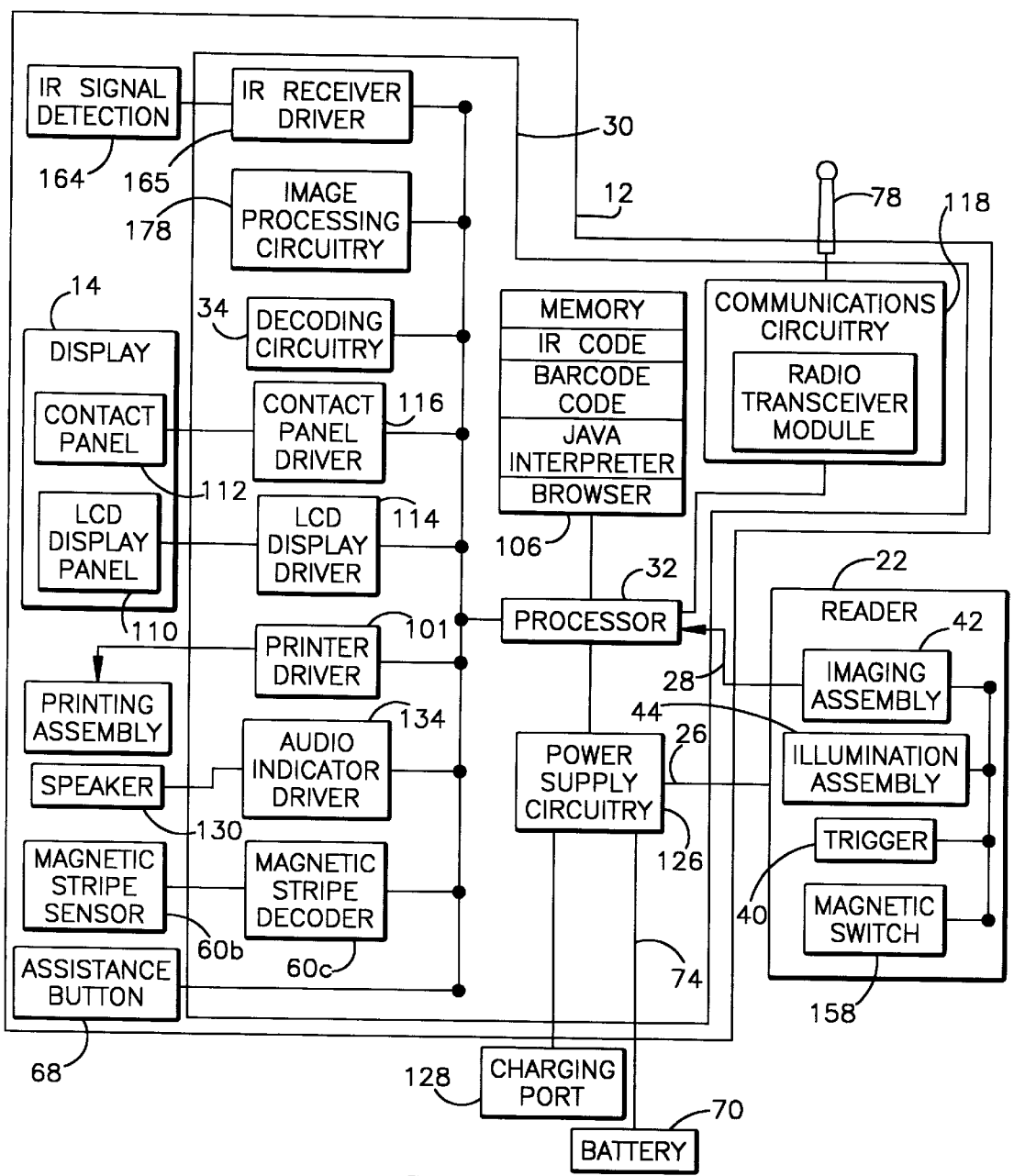
FIG. 5 is a schematic representation of selected electronic modules and circuitry of the customer information terminal of FIG. 2.

The customer terminal 10 also includes a high capacity battery 70 which is mounted in a case disposed on a bottom rack 72 of the shopping cart 18. The battery 70 preferably uses lead-acid technology because of its low cost, high energy capacity and lack of memory effect. The weight associated with a lead-acid battery is not a concern because it is mounted on the cart 18. A typical 6 volt, three cell lead-acid battery, such as the type used on a motorcycle, has an energy capacity sufficient to power the device 10 for a time period in excess of 24 hours. A power lead 74 connects the battery 70 to power circuitry 76 (shown schematically in FIG. 5) in the housing 12 which controls converting battery power to appropriate electrical parameters for operating the various components of terminal 10. The power circuitry 76 also includes charging circuitry and an external power supply port for connecting an external power supply for charging the battery. It will be appreciated that other suitable power systems, such as a photovoltaic system or hybridized power system may also advantageously be employed. Further, alternative shopping carts, such as those motor-drive carts for the physically impaired, will have their own power plant which can be utilized to supply sufficient power for the customer terminal 10.

The dataform reading assembly 22 is refractively tethered or attached to the housing 12 with an electrical cable 24. The dataform reader 22 is adapted to operate in at least two modes: a) a hand held mode; and b) a presentation mode. The hand held mode of operation is represented in FIG. 2, wherein the reader 22 is removed by the customer from an opening 36 in a side 38 of the housing 12. When supported in the opening 36, the reader 22 extends slightly beyond the side 38 so that the customer can easily grasp a front portion of the reader and slide it out of the opening. The customer moves the reader 22 to a dataform 30 (e.g., a barcode) of an item so desired to be purchases or priced by the customer. The customer activates a suitable selector, such as by depressing a trigger 40, to actuate an imaging assembly 42 and an illumination assembly 44 of the reader 22. The illumination assembly 44 advantageously provides a uniform illumination pattern that substantially corresponds to an imaging area or field of view 46 of the imaging assembly 42 and additionally generates a more intense cross hair illumination pattern 48 to aid the customer in positioning the reader 22 so that the dataform 30 (e.g., barcode) of an item 50 is properly within the imaging area of the reader. The uniform illumination pattern and cross hair aiming pattern are rapidly alternated between off and on states, such that one is off while the other is on. This alternation of illumination pattern avoids the difficulty of having to decode a captured dataform image which has an intense cross hair illumination pattern imposed thereon. The alternation of the illumination and cross hair patterns is rapid enough that it appears to the customer that the cross hair aiming pattern is continuously on.

While keeping the trigger 40 depressed, the customer aims the cross hair pattern 48 at a center of the dataform 30.

The customer moves the reader 22 toward the item 50 until an audible tone or "beep" is emitted by a speaker 130 indicating that the dataform 30 has been successfully read and decoded. The item's price and product name or description and product size will appear on the display 14. After the "beep" is heard, the reader 22 is returned to the opening 36 and slid into the housing 12.

Figure 4:
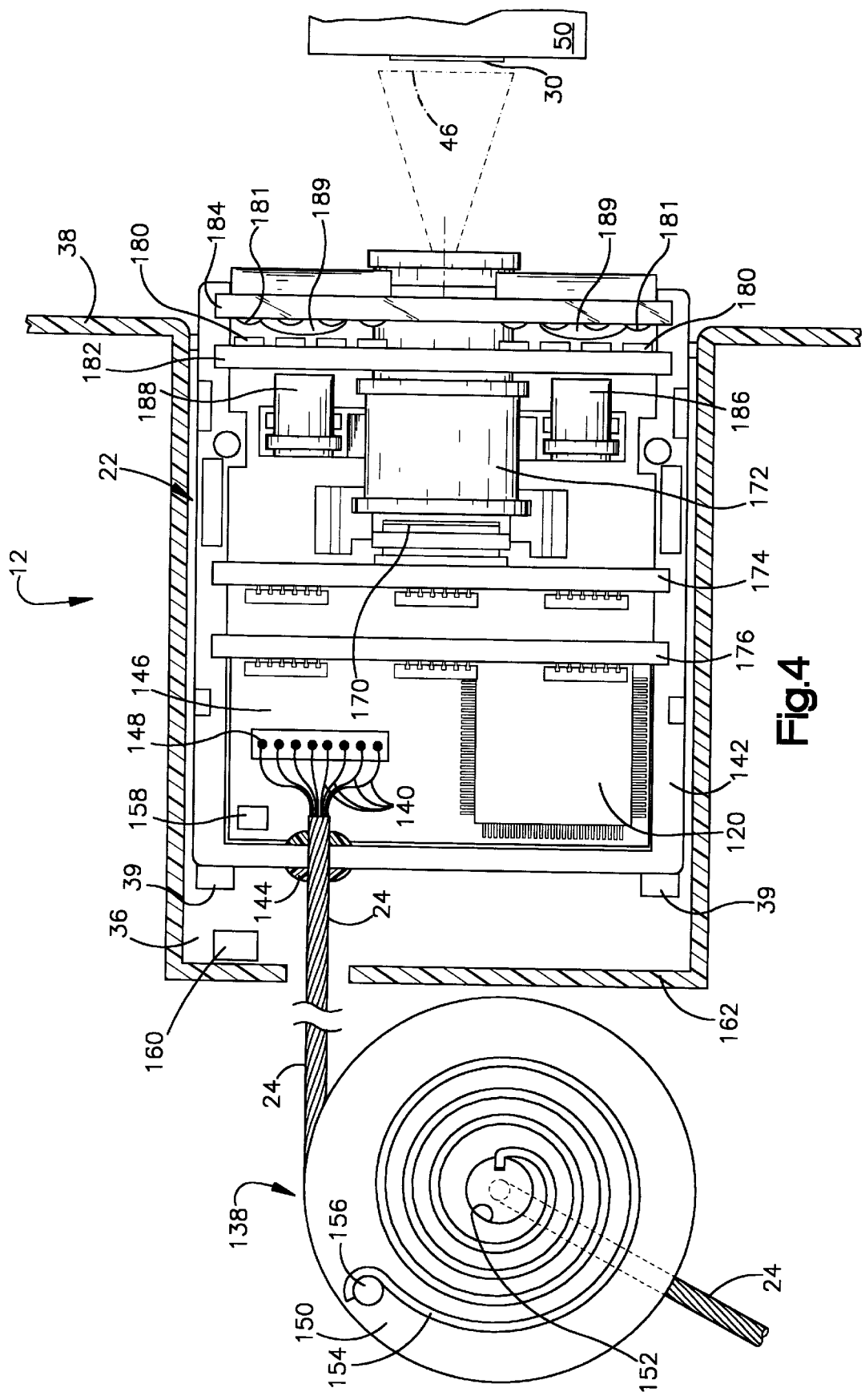
FIG. 4 is a view, partly in section and partly in top plan, of the retractable, tethered dataform reader of the customer information terminal of FIG. 2.

In the presentation mode of operation shown in FIGS. 1 and 4, the reader 22 is disposed in the housing opening 36 and the customer reads a dataform 30 affixed to an item 50 by moving the item to the reader 22. While the reader 22 remains in the housing opening 36, a magnetic switch 158 enclosed in a back portion of a reader module housing 142 of the reader 22 is turned on by a magnet 160 positioned in the opening 36 when the reader is positioned in the opening. Actuation of the magnetic switch 158 causes the imaging assembly 42 and the illumination assembly 44 to be actuated. Thus, the reader 22 is continuously ready to read a dataform when it is disposed in the opening 36. When a "beep" is heard, the customer knows that the dataform 30 has been successfully imaged and decoded. In this presentation mode, the illumination pattern is continuously on and the cross hair illumination pattern is deactivated since properly "aiming" the reader 22 is not a concern. The hand held mode is advantageously used when an item on a shelf is too large or too clumsy to move from the shelf or if the customer just wishes to check a price without removing the item from the shelf. The presentation mode is advantageously employed when a selected item is smaller and more easily handled.

FIG. 4 is a cut-away view of the reader 22 and a portion of the device 10 in the region of the opening 36 showing details of a recoil or cable retraction mechanism 138 of the dataform reader 22. The reader module housing 142 is a modular unit that includes a top half and a mating bottom half. Only the bottom half of the reader housing is shown in FIG. 4 so that the internal components of the reader 22 are visible in the figure. The reader 22 is connected to the housing 12 with the cable 24. The cable 24 includes the plurality of conductors 140 for: a) coupling operating power 26 to the reader 22; b) coupling the data signal 28 from the reader 22 to the processor 32; and c) coupling control signals from a processor 32 on control board 33 (FIG. 3) to the reader 22. The cable 24 is secured to the module housing 142 of the reader with a clamping grommet 144 to prevent the reader 22 from being physically separated from the cable 24. To further secure the reader 22 to the cable 24, a knot (not shown) may be tied in the cable just inside the reader housing 142. The plurality of conductors 140 are electrically coupled to a printed circuit board 146 within the reader housing 142 by a connector 148.

The housing 12 is advantageously weather-proofed to accommodate its being periodically exposed to the elements during periods of exposure, such as while in a parking lot. Within the housing 12, the cable 24 is wrapped around a recoil spool 150. The recoil spool 150 spins about a center pin 152 of the spool. The pin 152 is a hollow cylinder such that the cable 24 may be threaded through the pin 152 and connected to circuitry within the housing 12. A spirally wound bias spring 154 is secured to the pin 152 at the center of the recoil spool 150 and to the spring tab 156 at that perimeter of the recoil spool 150 to bias the spool in a counter clockwise direction (as viewed in FIG. 4). This arrangement keeps the cable 24 under tension when the reader 22 is removed from the housing opening 20. The edge formed by the housing wall 162 and the side wall 38 is rounded to avoid wearing an outer surface of the cable 24.

The reader 22 preferably utilizes a two-dimensional imaging assembly. The imaging assembly 42 includes a two-dimensional photo sensor array 170 and an optic assembly supported in a lens housing or shroud 172 for focusing an image of the dataform 30 in the field of view 46 onto the photo sensor array 170. Conventionally available circuitry on printed circuit boards 174, 176, and 146 operate to sequentially read out charges accumulating on photo sensors of the photo sensor array 170, generate an analog composite video signal, store a digital representation of a captured image, and decode the captured image to generate the decoded data signal 28. At least a portion of this image capture, image processing, and decoding circuitry may be implemented in code executed by processor 120 on the printed circuit board 146.

The illumination assembly 44 of the reader 22 includes four sets of four illumination light emitting diodes ("LEDs") 180, which are surface mounted in the preferred embodiment and positioned on a printed circuit board 182 (only two sets of the four sets of four illumination LEDs are seen in FIG. 4). The illumination LEDs direct illumination through corresponding aligned lens portions 181 of a lens array 184 towards the imaging field of view 46. Two targeting LEDs 186, 188 operate to direct illumination through aligned apertures in board 182 and through aligned lens portion 189 in the lens array 184 and generate the cross hair illumination pattern in the field of view 46 to assist the operator in relatively positioning the reader 22 and the dataform 30. As noted above, the cross hair illumination pattern is only generated when the reader 22 is used in the hand held mode. A more detailed description of the components of a suitable two dimensional imaging assembly for a hand held dataform reader and its operation can be found in U.S. patent application Ser. No. 08/609,344, filed Mar. 1, 1996, and entitled PORTABLE DATA COLLECTION DEVICE WITH LED TARGETING AND ILLUMINATION ASSEMBLY, the contents of which are incorporated herein in the entirety by reference.

Figure 3:
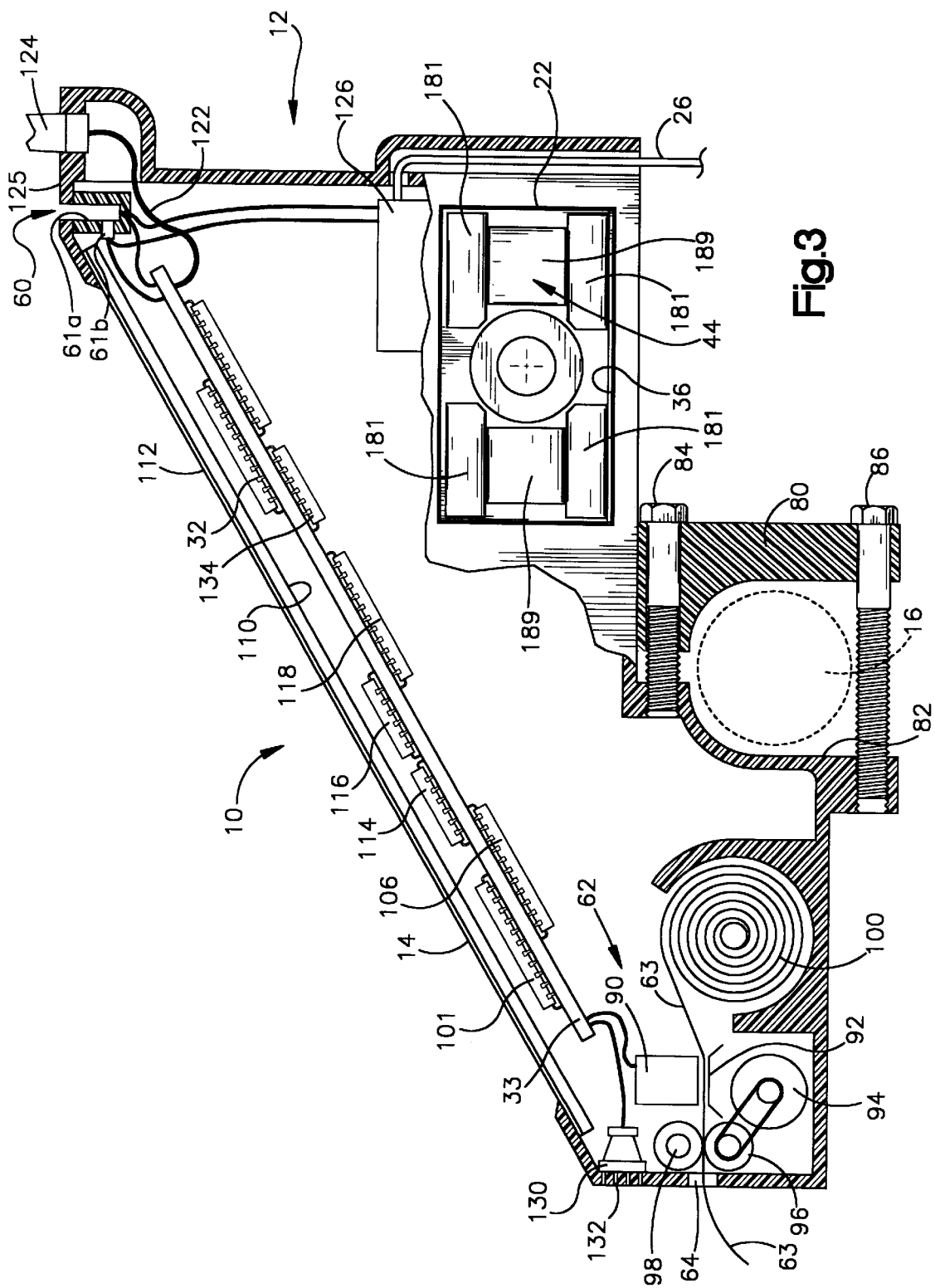
FIG. 3 is a view, partly in section and partly in elevation, of the customer information terminal of FIG. 2.

Referring to FIG. 3, a magnetic strip reader 60 is suitably molded into an upper surface 125 of the housing 12. The strip reader 60 includes a slotted opening 61a in the upper surface and includes a strip sensor and reader 61b disposed along the opening. Appropriate magnetic strip decoding circuitry is mounted on the control board 33. Magnetic strip sensors and decoding circuitry are commonly available.

A printing assembly 62, comprised of a thermal printer in the preferred embodiment, which functions to print out a paper receipt 63 for the customer at the completion of shopping session or a recipe for an item. The printing assembly 62 discharges the receipt or recipe printout through a slot shaped opening 32 in an upright front surface 66 of the housing 12. The thermal printer assembly 62 includes a thermal printhead 90 and an opposing platen 92 to position the paper 63 against the printhead 90. A motor 94 drives a feed roller 96. The feed roller 96 operates in conjunction with an idler roller 98 to draw paper 63 from a paper roll 100 past the printhead 90 and feed the receipt or recipe printout 63 out of the slot shaped opening 64 in the housing 12. Printer driver circuitry 101 for operating the printer assembly components is mounted on the control and decoder printed circuit board 33 disposed in the housing 12. At least a portion of the circuitry 101 is suitably embodied in code stored in a memory 106 represented by a memory chip on the control printed circuit board 33 and executed by the processor 32, both on printed circuitry board 33 thermal printing assemblies including these components are commonly available. It should be appreciated that the cost of the printer could be saved by placing common printers at chosen locations within the store. The terminal 10 would transmit data via the RF network 78 to a chosen common printer. The common printer will typically be chosen based on the location of the terminal within the store as determined by the location detection system.

The user interactive display screen 14 suitably includes a liquid crystal display ("LCD") display panel 110 and an overlying touch sensitive resistive contact panel 112. However, it will be appreciated that any variety of video display terminals, such as thin film transistor (active or passive), may suitably be used. Circuitry for operating the display panel 110 and the contact panel 112 includes LCD driver circuitry 114 and contact panel driver circuitry 116. Additionally, the circuitry 114, 116 for operating the LCD display and contact panels 110, 112 may, at least in part, be implemented in software stored in the memory 106 and executed by the processor 32.

The housing 12 also supports the speaker 130 which is mounted behind a grated opening 132 in the housing 12. The speaker 130 is driven by audio indicator driver circuitry 134 mounted on the control and decoder board 33 and provides audio feedback suitably in the form of a ½ second "beep" to the customer to indicate a successful dataform read and decode. The terminal 10 is secured to the shopping cart handle 16 by a clamping assembly which clamps the housing 12 to the cart pushing handle 16. The clamping assembly includes adjustable clamp 80 and an accurate clamping surface 82 of the housing 12. Two sets of two threaded bolts 84, 86 (only one set of two threaded bolts can be seen in FIG. 3) suitably extend between the clamp 80 and threaded openings in the housing 12 to secure the adjustable clamp 82 to the housing 12. When the two sets of threaded bolts 84, 86 are tightened, the housing 12 secured to the pushing handle 16 of the cart 18.

Referring again to FIG. 1, in the preferred embodiment the customer terminal 10 includes an RF transceiver for communication with a host computer 58 via a wireless local area network. Each access point 54 and 56, includes an RF transceiver for wireless communication with a customer terminal 10 located within the cell. An appropriate access point is the Aironet 640 and appropriate RF circuitry for customer terminal 10 includes the Aironet 025, both available from Aironet Wireless Communications, Inc. of Akron, Ohio. Other acceptable wireless networks include any spread spectrum networks operating in accordance with IEEE 802.11 Standard.

Referring to FIG. 3, the spread spectrum radio communications circuitry 118 may be embodied in one or more IC chips mounted on the printed circuit board 33. Alternatively, the spread spectrum communications circuitry 18 may lie implemented on a separate printed circuit board with a PCMCIA interface and secured to the printed circuit board 33 through a PCMCIA standard slot interface. An antenna lead 122 connects the communications circuitry to an antenna mast 124 extending through an opening in the upper surface 125 of the housing 12. Alternatively, the antenna mast is suitably disposed inside the housing.

Referring yet again to FIG. 1, an infrared receiver 164 is located on the top portion of the upper surface of the customer information terminal 10. The receiver detects the signature illumination pattern generated by each of a plurality of infrared transmitters 166 and 168 positioned throughout the store. It is anticipated that these transmitters 166 and 168 will be placed on top shelving or in the ceiling such that the signature pattern is detectable only within a predetermined area of the store 174 and 176. Detection of a particular signature pattern indicates that the terminal is within the predetermined zone of the store. Each emitter continually modulates the IR illumination source on and off in a distinctive 1/0 pattern. The infrared receiver includes a photo detector which generates an analog waveform in accordance with the distinctive illumination pattern which, based on thresholding, can easily be decoded into the signature pattern of ones and zeros in the IR receiver driver 165. Alternatively, any position locator, such as a transponder based system, may suitably be substituted for the above-detailed zone-based system and still accomplish the position detection.

A detailed description of the operation of the terminal unit and an associated server, can be found in U.S. patent application Ser. No. 08/770,690, filed Dec. 19, 1996, and entitled SHOPPING CART MOUNTED PORTABLE DATA COLLECTION DEVICE WITH TETHERED DATAFORM READER, the contents of which are incorporated herein in the entirety by reference.

Next, a detailed description will be provided for a system incorporating an end user terminal which allows for ease in assembly of shopping list information, as well as communication of such a data base formed from such information to the retailer. The subject invention is provided with a detailed description of a preferred embodiment employing an application-specific, portable hand-held terminal. However, it will be appreciated by one of ordinary skill in the art that a similar form and function may be accomplished with a personal computer workstation as may be found in a significant number of conventional households.

Figure 6:
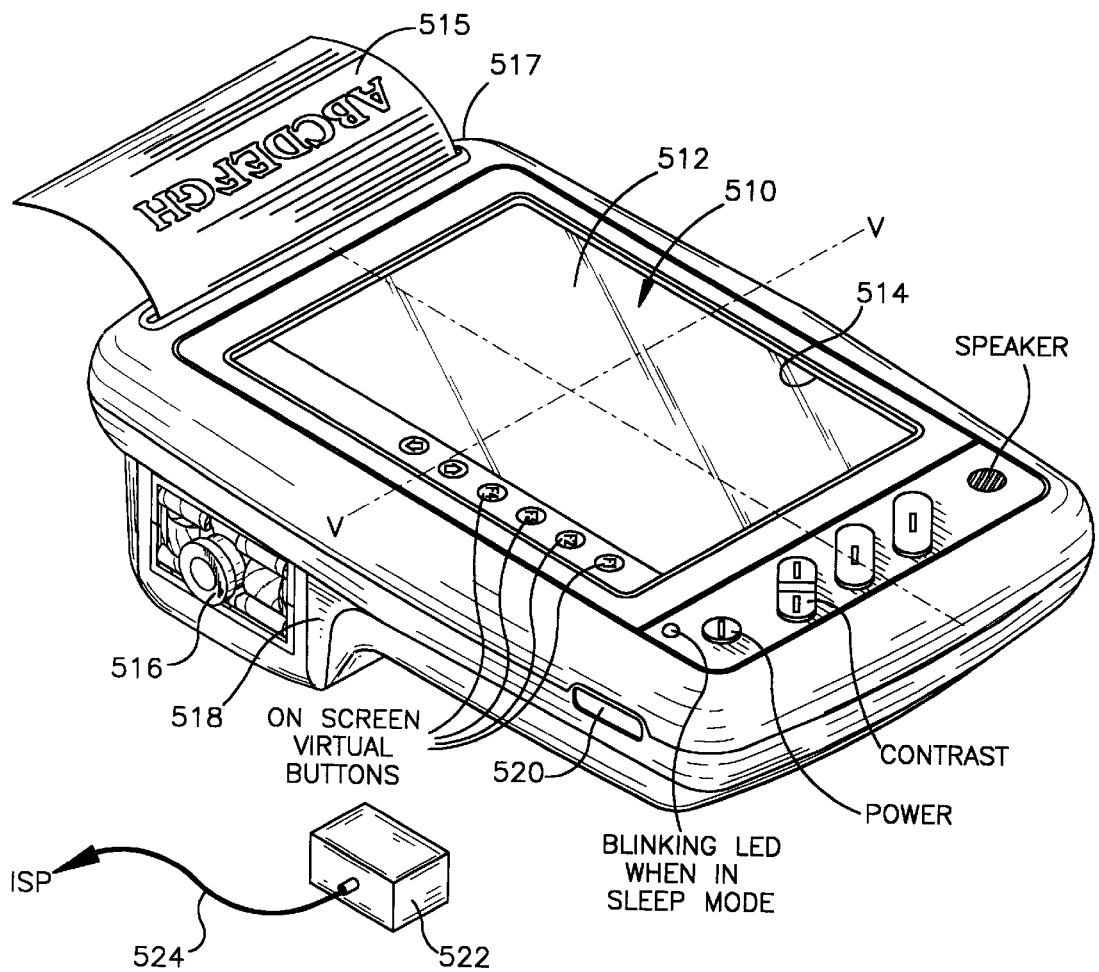
FIG. 6 is a perspective view of a hand-held consumer terminal suitably used in connection with the assembly and transmission of an automated shopping list in connection with the subject application.

FIG. 6 shows the preferred embodiment of a consumer terminal specifically designed for use in conjunction with consumer assembly and transmission of shopping list information. It includes an interactive display screen 510 which suitably includes a liquid crystal display screen 512 with an overlaying or integrated contact panel 514. A barcode reader 516 of construction, suitably similar to that described with reference to the shopping cart terminal, is mounted within the housing 518. A printer system advantageously integrated in the housing 518, and is suitably of similar construction to that described with reference to the shopping cart terminal. The printer 518 discharges paper 515 through a slot shaped opening 517 in the housing 518.

Figure 7:
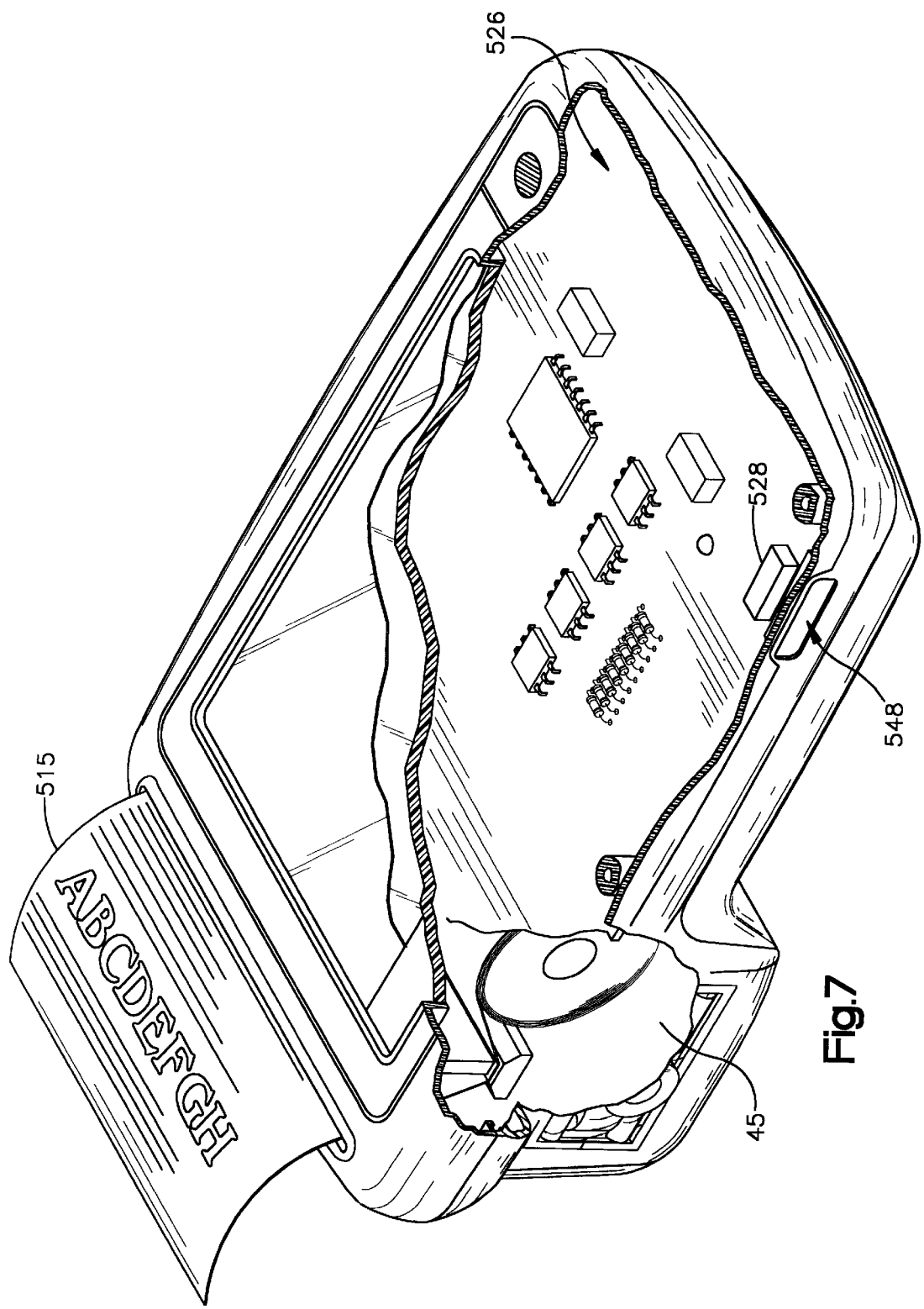
FIG. 7 illustrates a perspective, cut-away view of an interior of the unit of FIG. 6.
Figure 8:
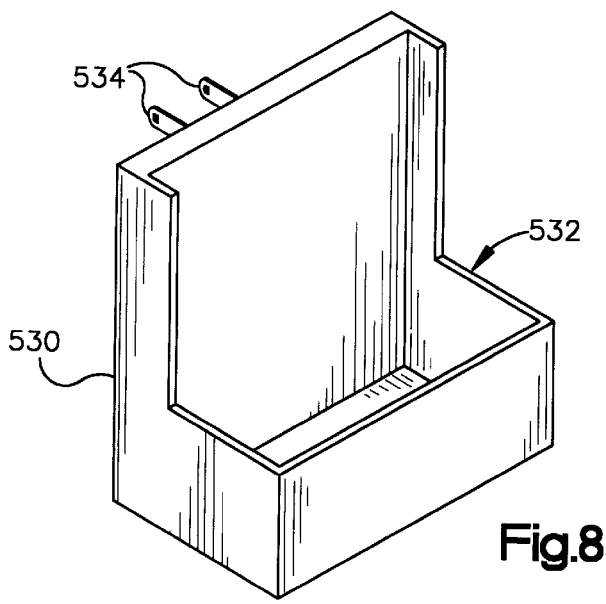
FIG. 8 is a perspective view of a suitable docking station/charging station for use in connection with the portable unit of FIGS. 6 and 7.
Figure 9:
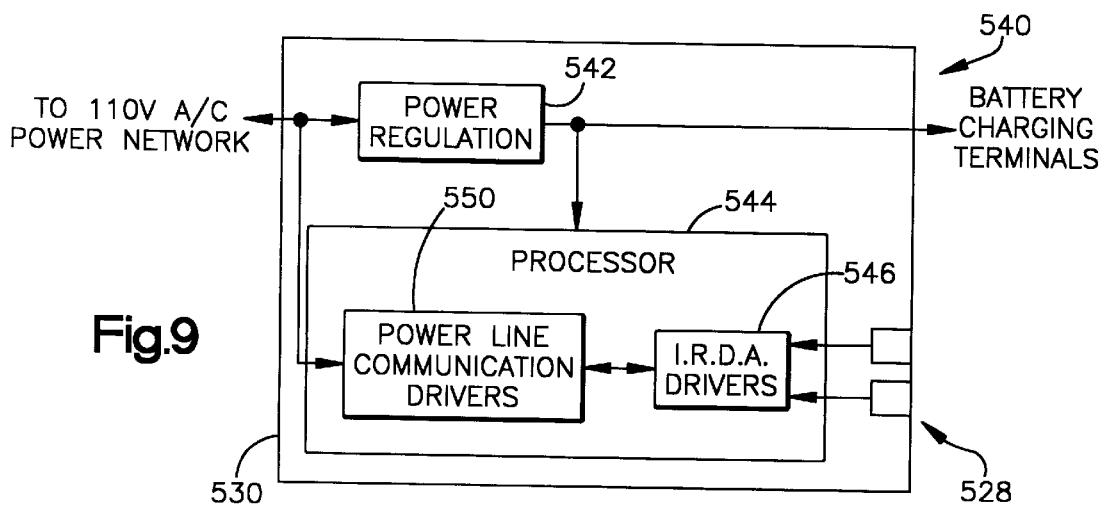
FIG. 9 is a block diagram of circuitry disposed within the docking station of FIG. 8.

The terminal also includes a communications port 520. The port 520 may be modem circuitry with an RJ II connector 522 for communication with an ISP via Plain Old Telephone Service (POTS) subscriber loop 524. Alternatively, in FIG. 7 the port may include IRDA circuitry 526 and an LED/photo sensor 528 combination for infra red communication with an aligned IRDA port in a docking cradle 530 shown in FIG. 8. It will be appreciated that any physical/transparent layout scheme including integrated services digital network, asynchronous mode transmission, etc. is also suitably employed. The docking cradle 530 includes structure 532 for holding the terminal and 110V outlet prongs 534 for securing the docking cradle to an outlet (not shown) on the wall in the consumer's home. The circuity within the docking cradle 530 is best described with reference to block diagram 540 of FIG. 9. The docking cradle 530 advantageously includes power regulation circuitry 542 for converting household 110V AC power to power suitable for charging the batteries in the terminal and suitable for powering a docketing cradle processor 544. The docking station processor 544 includes IRDA drivers 546 for communicating with the terminal via the IRDA port 528 and powerline communication drivers 550 for sending and receiving signals modulated on the home's AC power distribution network. Both of these drivers may, in part, be embodied in code stored in a memory and executed by a microprocessor.

Figure 10:
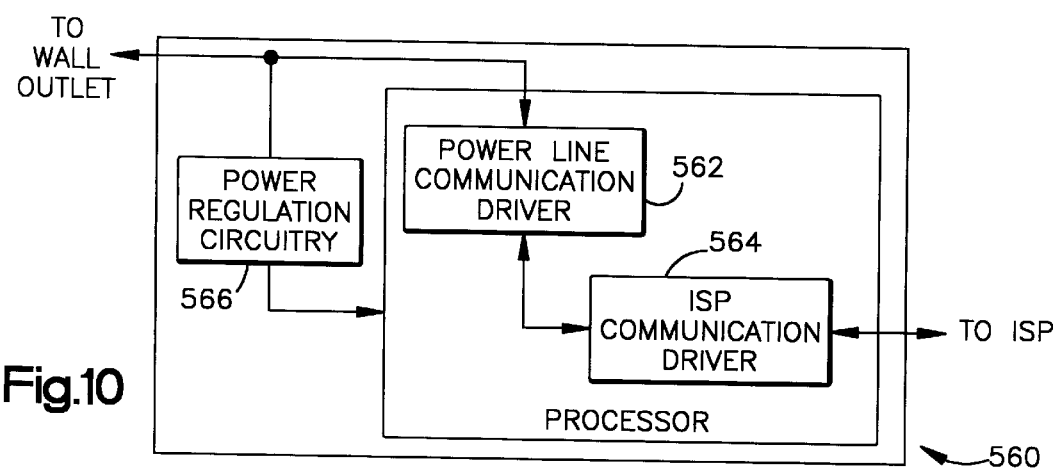
FIG. 10 is a block diagram of a suitable communications gateway or interface for use in placing a consumer terminal in data communication with a base unit.

FIG. 10 is a block diagram of a consumer gateway 560. It includes a powerline communication driver 562 for communicating with the docking cradle 530 via the home's power distribution network (not shown) and communication drivers 564 adapted to communicate with an Internet service provider. Power regulation circuitry 566 powers the drivers. It should be appreciated that this gateway circuitry may be embodied in a cable TV box which provides communication to an Internet router via the co-axial cable. Alternatively, this circuitry may be in a telephone or other device which is connected to an Internet Service Provider ("ISP") through a telephone service subscriber loop.

A detailed description of the operation of an electronic shopping list program run on a merchant's server and a program run on the server when the server receives a link request indicating that the consumer desires to review a coupon file, can be found in U.S. patent application Ser. No. 08/770,690, filed Dec. 19, 1996, and entitled SHOPPING CART MOUNTED PORTABLE DATA COLLECTION DEVICE WITH TETHERED DATAFORM READER. The contents of this application is fully incorporated herein by reference.

Figure 11:
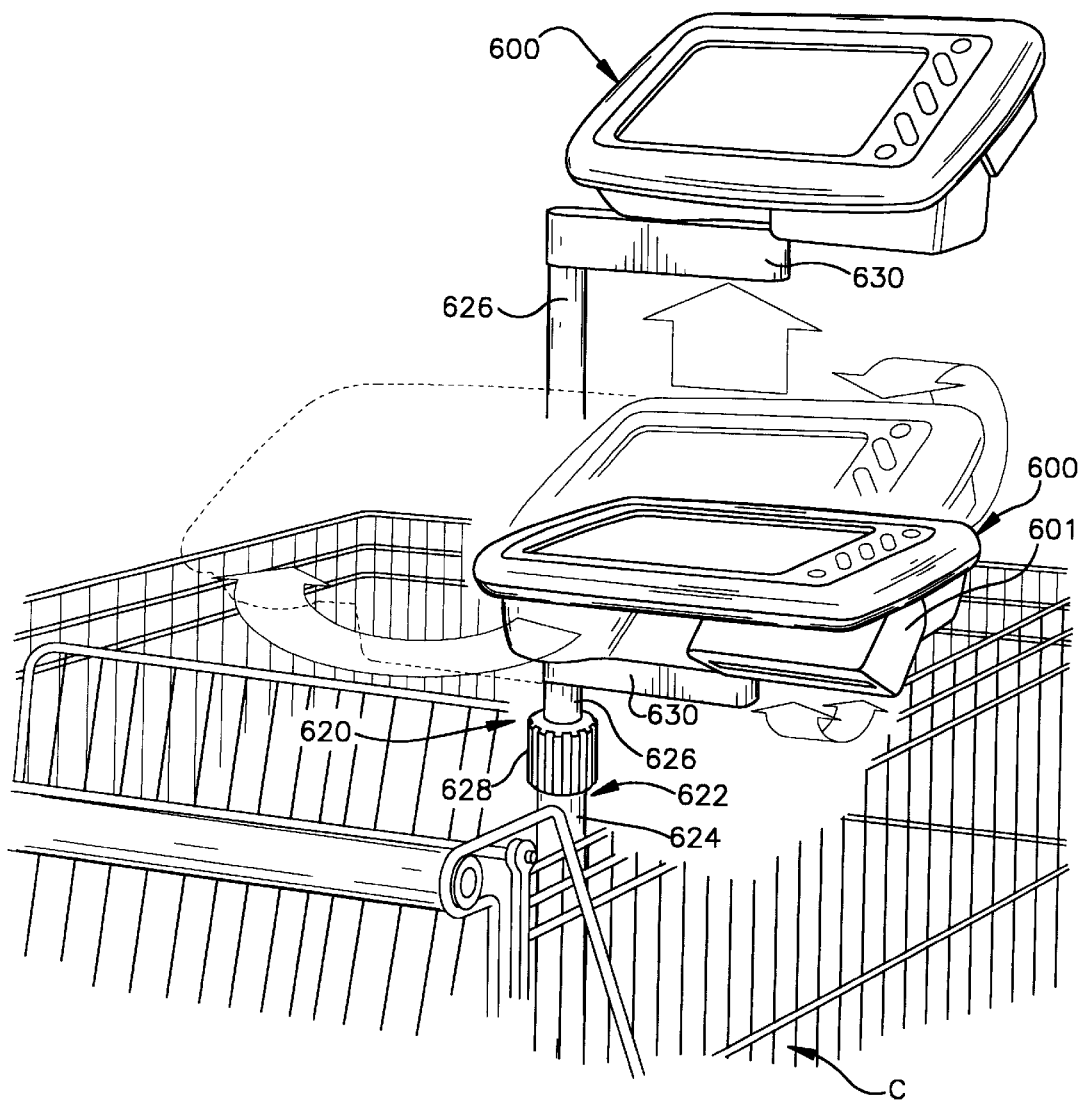
FIG. 11 is a perspective view of a docking member for a data collection device, according to one embodiment of the present invention.

Referring now to FIG. 11, there is shown a docking member 620 for conveniently locating data collection device 600 on a cart C. It should be appreciated that data collection device 600 may have structure and circuitry similar to above-described customer terminal 10 (see FIGS. 2–5). Docking member 620 is generally comprised of a telescoping post 622 and a mounting arm 630. Telescoping post 622 includes a first rod 624, a second rod 626 and a coupling 628. First rod 624 is fixed to cart C, and includes a hollow shaft for receiving second rod 626. Second rod 626 extends from the hollow shaft of first rod 624 to a desired height. Coupling 628 is provided to fix the position of second rod 626 relative to first rod 624. Accordingly, coupling 628 locks second rod 626 at the desired height. Mounting arm 630 extends from the top of second arm 626 in a direction generally perpendicular to the longitudinal axis of telescoping post 622, and supports data collection device 600. Arm 630 includes an interface portion for attaching/receiving data collection device 600. In a preferred embodiment, the interface portion has a recess formed therein, wherein the recess is dimensioned to receive a mounting post formed in the base of data collection device 600. It should be appreciated that data collection device 600 includes a scanner portion 601, which is rotatable to a suitable scanning position.

As illustrated in FIG. 11, docking member 620 provides two degrees of movement. In this regard, the height of telescoping post 622 is adjustable by moving second rod 626 in the direction of the longitudinal axis of telescoping post 622. Furthermore, the position of arm 630 is adjustable by rotating arm 630 (clockwise or counterclockwise) about the longitudinal axis of telescoping post 620. Accordingly, a user can adjust docking member 620 to a position suitable for conveniently using data collection device 600.

Figure 12:
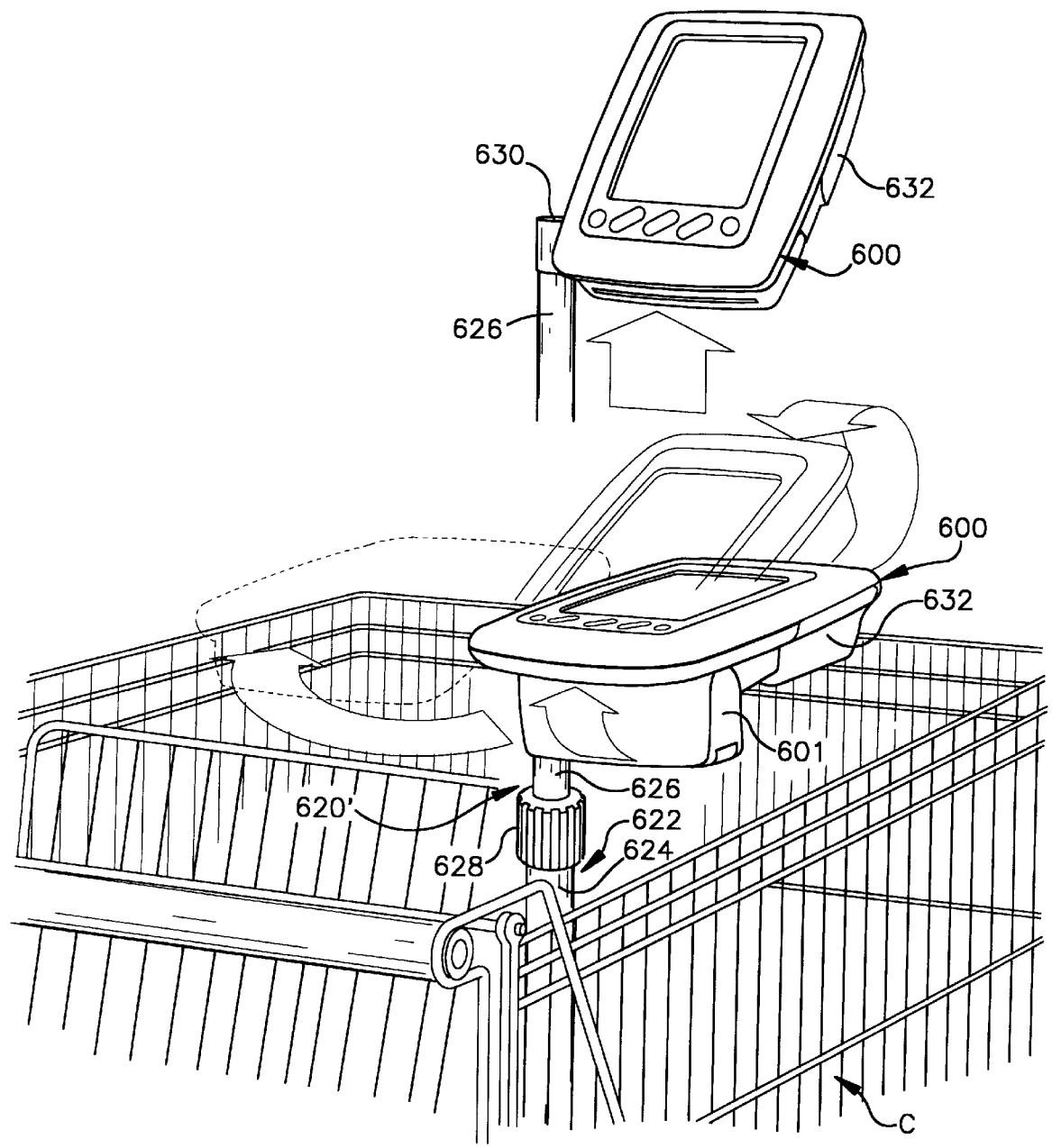
FIG. 12 is a perspective view of a docking member for a data collection device according to another embodiment of the present invention.

FIG. 12 shows an alternative embodiment of a telescoping docking member. In this embodiment, docking member 620' is essentially the same as docking member 620 shown in FIG. 11. However, mounting arm 630 includes a cradle 632. Cradle 632 is dimensioned to receive data collection device 600. In all other respects, docking member 620' operates in the same manner as docking member 620.

Referring now to FIGS. 13A and 13B, there is shown a hanging docking member 650 according to another embodiment of the present invention. Docking member 650 is dimensioned to receive a portable data collection device 602 having a main housing portion 603 and a trigger handle portion 605. Docking member is adapted to be hanged from a thin wall portion W of cart C. Docking member 650 is generally comprised of a main body portion 652, mounting arms 660 and an L-shaped bracket 666. Main body portion 652 includes an elongated slot 654, which is dimensioned to receive wall portion W. Slot 654 is defined by a front wall 655 and a rear wall 657. An opening 656 is formed in main body portion 652 for allowing a scanner light beam to pass therethrough. Mounting arms 660 extend from the upper end of main body portion 652, and are dimensioned to receive data collection device 602. In this regard, arms 660 support data collection device 602 by engaging with the sides of main housing portion 603. L-shaped bracket 670 extends downward from main body portion 652, and includes a vertical portion 667 and a horizontal portion 668. Horizontal portion 668 engages with the bottom surface of trigger handle portion 605 to provide further support for data collection device 602.

An alternative embodiment of a hanging docking member is shown in FIG. 13C. Hanging docking member 680 is generally comprised of a main body portion 682, mounting arms 700 and an L-shaped bracket 706. Main body portion 682 includes an opening 686 and a clip portion comprised of a movable front wall 690 and a fixed rear wall 688. Opening 686 allows a scanner light beam to pass therethrough. Movable front wall 690 is adapted to pivot about an axis A. A bias means, such as a spring, biases front wall 690 towards rear wall 688, as shown in FIG. 13C. A gripping member 692 extends downward from front wall 690 to provide an additional gripping surface for engaging docking member 680 with a wall portion of a cart. Front wall 690 and rear wall 688 define an elongated slot 684 therebetween. Slot 684 is dimensioned to receive the wall portion of a cart. In other respects, docking member 680 operates in the same manner as docking member 650, described above.

It should be understood that the docking member may be integrated with the housing of the data collection device. In this regard, a suitable gripping member may form an integral part of the data collection device housing. Accordingly, the data collection device may be suitably hanged from a wall portion W without the use of a separate docking device.

Figure 14:
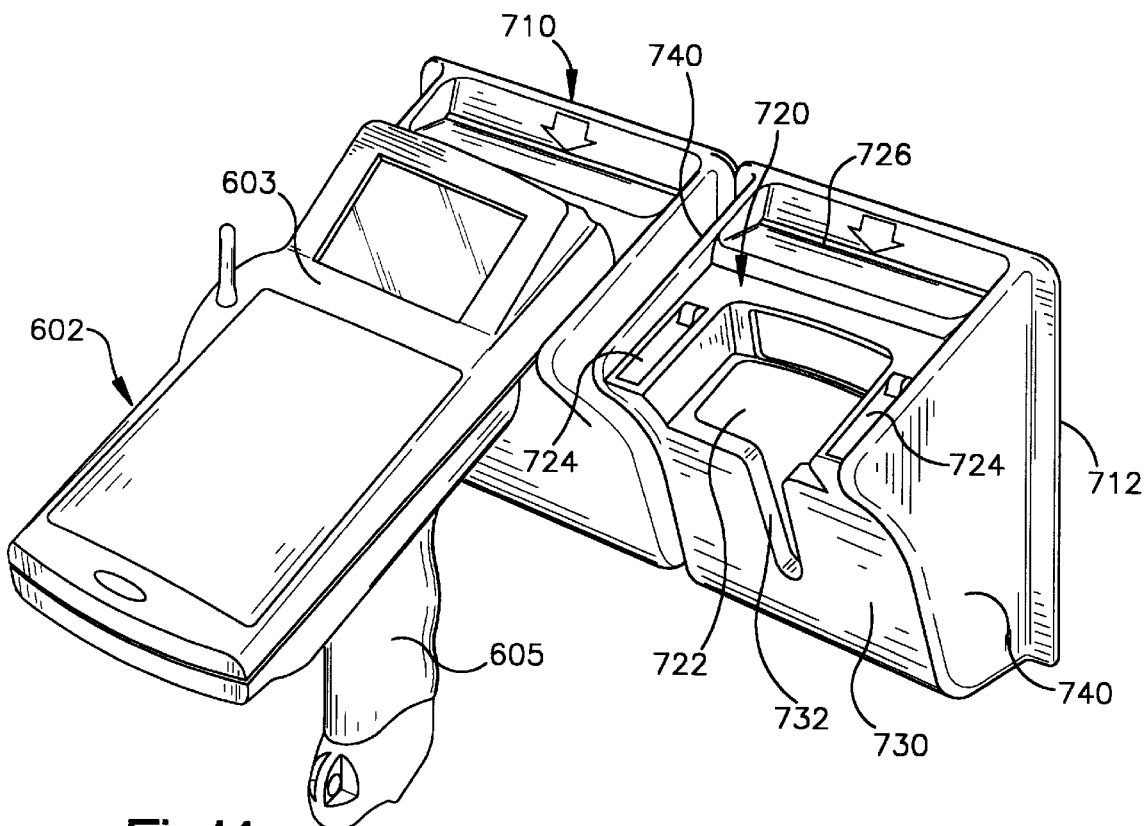
FIG. 14 is a perspective view of a docking member for a data collection device, according to yet another embodiment of the present invention.

Turning now to FIG. 14, there is shown a pair of wall-mounted docking members 710. Docking member 710 is generally comprised of a horizontal support surface 712, a top face 720, a front face 730 and a pair of side faces 740. Horizontal support surface 712 is a generally planar surface suitable for mounting docking member 710 to a wall or other generally vertical planar surface. Front face 730 includes an elongated vertical slot 732, which is also dimensioned to receive a portion of data collection device 602. Top face 720 includes a recessed central opening 722, lateral slots 724 and a card slot 726. Central opening 722 is dimensioned to receive a data collection device 602, as shown in FIG. 14. Lateral slots 724 may include locking members for engaging with data collection device 602. In this regard, card slot 726 is dimensioned to receive a data card having a magnetic strip. A magnetic strip reader system reads and decodes the data encoded on the magnetic strip. The data may include such information as a customer ID number. The magnetic strip reader system (or an associated host computer receiving data from the magnetic strip reader system) processes the decoded information and determines whether the locking members in lateral slots 724 should be in an engaged or disengaged condition. For instance, when the appropriate customer ID number is input to the system, an associated data collection device is released to the customer by sending a release signal to the locking members. In this manner, data collection device 602 can be locked to or unlocked from docking member 710. Where a host computer processes the decoded information, the magnetic strip reader system may provide the host computer with terminal ID data (identifying the particular docking member or data collection device), along with the customer ID data (identifying a particular customer). This data may be communicated to the host computer via the data collection device.

It should be appreciated that a barcode reader system for reading and decoding barcodes is a suitable substitute for the magnetic strip reader system. In this case, the ID card would include a barcode. The barcode reader system may form an integral part of the data collection device, wherein the docking member includes a support structure (e.g., a slot) for supporting the ID card in front of the barcode reader system.

Further, it should be understood that the host computer may store additional customer data files, such as data indicating items selected for purchase by the customer (i.e., a running receipt of purchases), data indicating items which the customer desires to purchase (i.e., a shopping list), and data indicating a customer's preferences (e.g., data collection device operating parameters including font type, font size, display colors, etc.). The barcode data scanned in during shopping, as items for purchase are selected, may modify the customer data files associated with a particular customer. Moreover, the host computer may communicate advertising data to the data collection device for the customer viewing the display, wherein the advertising data is communicated in response to the barcode data communicated to the host computer by the customer's data collection device. The host computer may also include a TCP/IP communications means for communicating data with a data collection device used at the customer's home. This data may be used to modify the customer data files.

Figure 15:
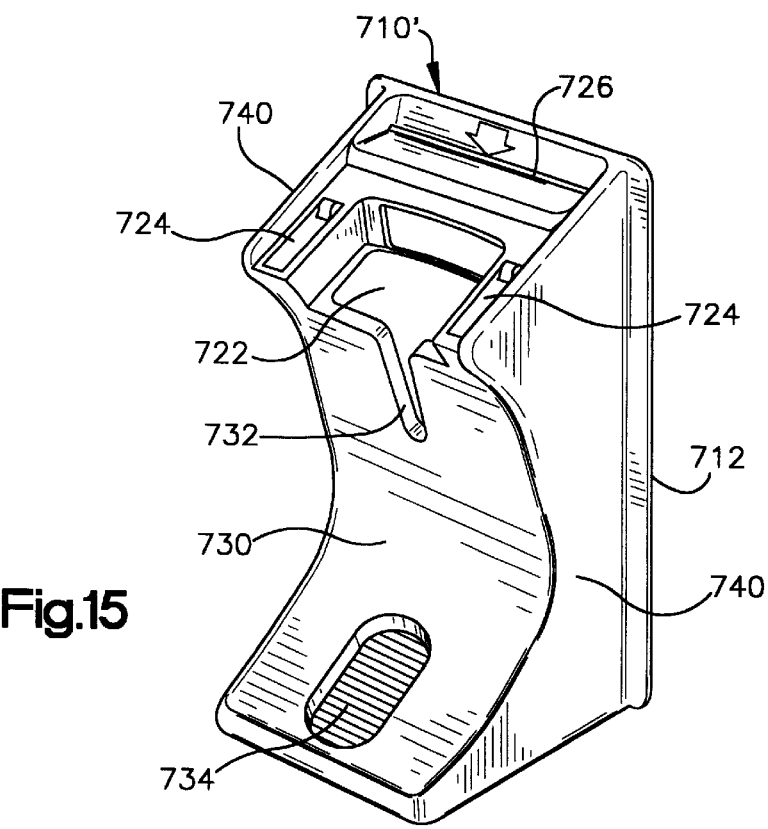
FIG. 15 is a perspective view of an alternative embodiment of the docking member shown in FIG. 14.

FIG. 15 shows an alternative embodiment for the wall-mounted docking member. Docking member 710' is essentially the same as docking member 710, shown in FIG. 14. However, front face 730 and side faces 740 are elongated. Moreover, an opening 734 is formed in front face 730. Opening 734 is dimensioned to receive trigger handle portion 605 of data collection device 602. Accordingly, docking member 710' provides additional support for data collection device 602. It should be appreciated that data collection device 602 may have structure and circuitry similar to above-described customer terminal 10 (see FIGS. 2–5).

Figure 16:
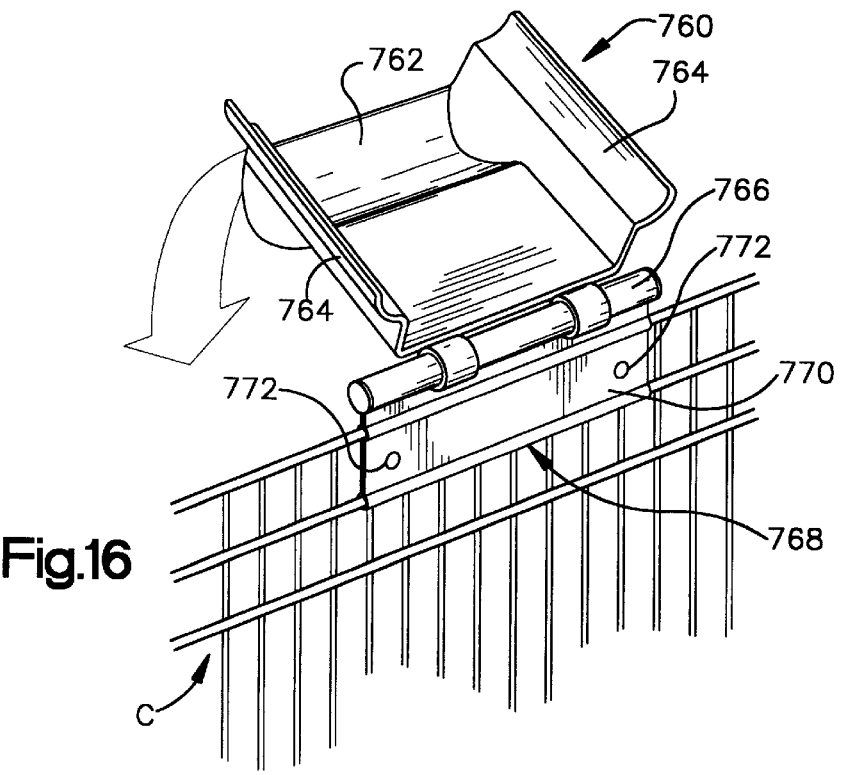
FIG. 16 is a perspective view of a docking member for a data collection device, according to yet another embodiment of the present invention.

Referring now to FIG. 16, there is shown a hinged mounting member 760, according to yet another embodiment of the present invention. Mounting member 760 is generally comprised of a mounting tray 762, a hinge 766 and a mounting bracket 768. Mounting bracket 768 includes a pair of plates 770 connected by fasteners 772. Mounting bracket 768 mounts docking member 760 to a cart C. Mounting tray 762 supports a data collection device. In this regard, mounting tray 762 includes a pair of receiving brackets dimensioned to receive and engage the data collection device. Mounting tray 762 is movable about hinge 766, and thus has one degree of freedom.

Figure 17:
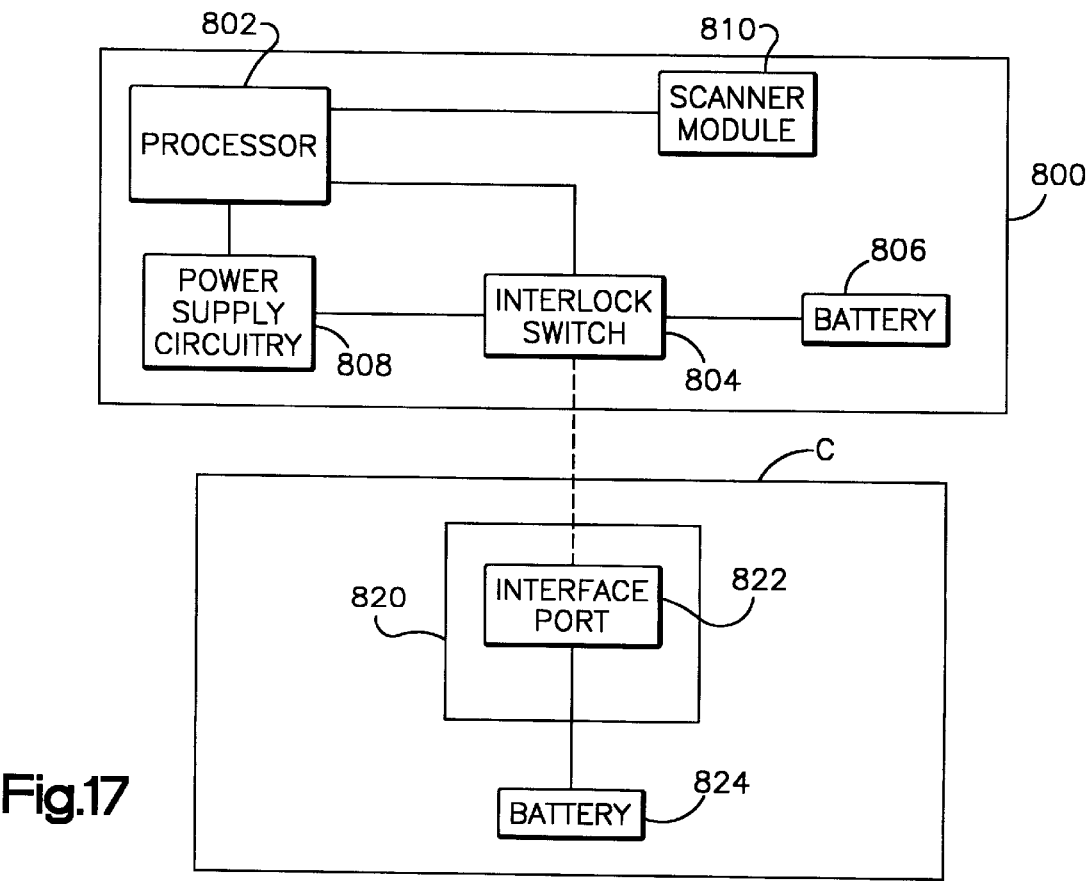
FIG. 17 is a schematic block diagram of an interlock switching system, according to a preferred embodiment of the present invention.

The above-described docking members allow for the convenient use of a data collection device in both remote and docked positions. Accordingly, the present invention is also directed to means for providing alternative sources of power for the data collection device. In this respect, FIG. 17 shows an interlock switching system which finds particular advantage in connection with the docking member described above. In this regard, the docking member of the present invention allows a data collection device to be easily removed from a docked position (e.g., a shopping cart or wall) for remote use. As a result, the data collection device may be alternatively powered by an internal power source residing within the data collection device itself, or by an external power source situated at the docked location. Accordingly, an interlock switching system is provided to switch between an internal power source located inside the data collection device and an external power source located outside the data collection device. FIG. 17 shows a schematic block diagram of a portion of a data collection device 800 and a cart C. It should be appreciated that data collection device 800 may have structure and circuitry similar to above-described customer terminal 10 (see FIGS. 2–5). Data collection device 800 includes a processor 802, an interlock switch 804, a battery 806, power supply circuitry 808 and a scanner module 810. Processor 802 provides operational control of data collection device 800. Power supply circuitry 808 controls the conversion of battery power to appropriate electrical parameters for operating the various components of data collection device 800, including processor 802. Power supply circuitry 808 also includes charging circuitry. Battery 806 is preferably a rechargeable battery. Interlock switch 804 switches the power source providing power to power supply circuitry 808, as will be explained below. Scanner module 810 is provided to read a dataform and transmit the data read therefrom to processor 802. In a preferred embodiment scanner module 810 takes the form of a barcode reader.

Cart C includes a docking member 820, such as those described in detail above. Docking member includes an electrical interface port 822, which interacts with interlock switch 804 to signal interlock switch 804 that the data collection device 800 has been received in docking member 820. For instance, interface port 822 may include an actuator for engaging interlock switch 804 when data collection device 800 is properly seated in docking member 820. Interface port 822 also includes terminals for connecting interlock switch to battery 824. Battery 824 is preferably a high capacity battery which, for purposes of illustration, is mounted in a case disposed on a bottom rack of cart C. Battery 824 preferably uses lead-acid technology because of its low cost, high energy capacity and lack of memory effect. The weight associated with a lead-acid battery is not a concern because it is mounted on cart C. It will be appreciated that other suitable power systems, such as a photovoltaic system or hybridized power system may also advantageously be employed. Further, carts, such as motor-drive carts for the physically impaired, will have their own power plant which can be utilized to supply sufficient power for data collection device 800.

When data collection device 800 is seated in docking member 820, interlock switch 804 makes positive contact with interface port 822. As a result, interlock switch 804 causes power supply circuitry 808 to draw power from external battery 824, rather than internal battery 806. Accordingly, battery 824 supplies power for both operation of data collection device 800 and for charging internal battery 806.

It should also be appreciated that interlock switch 804 is suitably arranged to switch modes for scanner module 810. In this regard, when data collection device 800 is seated in docking member 820, scanner module 810 is continually on, so as to operate as in a presentation mode (which is described in detail above). The presentation mode may include an autosense operation where the scanner module is periodically activated to detect the presence of a dataform (e.g., barcode), and upon detection activates the scanner module to read and decode the dataform. When data collection device 800 is not seated in docking member 820 scanner module 810 is in a power savings mode, wherein scanner module 810 operates only upon manual actuation of a trigger switch button on the data collection device.

The invention has been described with reference to the preferred embodiment. Obviously, modifications and alterations will occur to others upon a reading and understanding of this specification. For instance, the means for attaching the docking member to the cart may take many other suitable forms, including a spring clip, spring clamp or the like. Moreover, it should also be appreciated that the docking member may be integral with the data collection device. Accordingly, the clip, clamp or other means of attachment may be integrated with the housing for the data collection device. In addition, the docking member structure for receiving and supporting the data collection device shown herein are exemplary only, and may take a variety of different forms. It is intended to include all such modifications and alterations insofar as they come within the scope of the appended claims or the equivalents thereof.

Having thus described the invention, it is now claimed:

1. A customer information terminal system comprising:
   (a) a host computer system having memory means for storing customer shopping data for a plurality of customers;
   (b) a customer information terminal including:
      dataform reader means adapted for reading and decoding a dataform,
      input means adapted for inputting data to the customer information terminal,
      terminal communication means adapted for communicating data between the customer information terminal and the host computer system,
      display means adapted for displaying data,
      rechargeable power supply means adapted for supplying power to the customer information terminal, and
      coupling means adapted for coupling the customer information terminal to a docking means;
   (c) at least one docking means adapted for supporting a customer information terminal, the at least one docking means located in a central docking area and including an electrical interface means for coupling said customer information terminal to a first external power source for at least one of operating said customer information terminal and charging the rechargeable power supply means; and
   (d) at least one cart means, wherein each said cart means includes a support means for supporting a customer information terminal,
   wherein said system further comprises in the central docking area:
      identification means for identifying a customer;
      association means for associating a particular customer information terminal with a particular customer; and
      release means, responsive to said association means, for releasing a customer information terminal from said docking means.

2. A customer information terminal system according to claim 1, wherein said customer information terminal includes gripping means for gripping a support structure of said cart means, said support structure including a wall portion of said cart means.

3. A customer information terminal system according to claim 1, wherein said cart means supports a second external power source, and said support means includes electrical interfacing means for coupling said customer information terminal to the second external power source for at least one of operating said customer information terminal and charging the rechargeable power supply means.

4. A customer information terminal system according to claim 2, wherein said customer information terminal includes mode changing means for operating said dataform reader means in a presentation mode when said customer information terminal is coupled with said support means, and for operating said dataform reader means in a power saving mode when said customer information terminal is not coupled with said support means.

5. A customer information terminal system according to claim 3, wherein said customer information terminal includes mode changing means for operating said dataform reader means in a presentation mode when said customer information terminal is coupled with said support means, and for operating said dataform reader means in a power saving mode when said customer information terminal is not coupled with said support means.

6. A customer information terminal means according to claim 4, wherein said presentation mode includes an autosense operation wherein the dataform reader means is periodically activated to detect the presence of a dataform, and upon detection, activated to read and decode the dataform.

7. A customer information terminal means according to claim 5, wherein said presentation mode includes an autosense operation wherein the dataform reader means is periodically activated to detect the presence of a dataform, and upon detection, activated to read and decode the dataform.

8. A customer information terminal system according to claim 6, wherein customer information terminal includes a trigger means for activating said dataform reader means, and said power saving mode includes a trigger button operation, said dataform reader means activated to read and decode a dataform upon manual activation of said trigger means.

9. A customer information terminal system according to claim 7, wherein customer information terminal includes a trigger means for activating said dataform reader means, and said power saving mode includes a trigger button operation, said dataform reader means activated to read and decode a dataform upon manual activation of said trigger means.

10. A customer information terminal system comprising:
   (a) a host computer system having memory means for storing customer shopping data for a plurality of customers;
   (b) a customer information terminal including:
      dataform reader means adapted for reading and decoding a dataform,
      input means adapted for inputting data to the customer information terminal,
      terminal communication means adapted for communicating data between the customer information terminal and the host computer system,
      display means adapted for displaying data,
      power supply means adapted for supplying power to the customer information terminal, and
      coupling means adapted for coupling the customer information terminal to a docking means;

(c) at least one docking means adapted for supporting a customer information terminal, the at least one docking means located in a central docking area; and (d) at least one cart means, wherein each said cart means includes a support means for supporting a customer information terminal, wherein said system further comprises in the central docking area:

identification means for identifying a customer;

association means for associating a particular customer information terminal with a particular customer; and release means, responsive to said association means, for releasing a customer information terminal from said docking means.

11. A customer information terminal system according to claim 10, wherein said identification means includes a magnetic strip reader system for reading and decoding identification data encoded on a magnetic strip of an ID card.

12. A customer information terminal system according to claim 1, wherein said identification means includes a magnetic strip reader system for reading and decoding identification data encoded on a magnetic strip of an ID card.

13. A customer information terminal system according to claim 11, wherein said system further comprises in the central docking area:

communication means for communicating identification data and terminal identification data to said host computer system, and means for receiving terminal release authorization from the host computer system.

14. A customer information terminal system according to claim 12, wherein said system further comprises in the central docking area:

communication means for communicating identification data and terminal identification data to said host computer system, and means for receiving terminal release authorization from the host computer system.

15. A customer information terminal system according to claim 10, wherein said identification means includes support means for supporting in front of the dataform reader means an ID card having a dataform, such that the dataform reader means can read and decode the dataform thereon.

16. A customer information terminal system according to claim 1, wherein said identification means includes support means for supporting in front of the dataform reader means an ID card having a dataform, such that the dataform reader means can read and decode the dataform thereon.

17. A customer information terminal system according to claim 15, wherein said terminal communication means operates to communicate ID data and terminal data to said host computer system and receive terminal release authorization from said host computer system.

18. A customer information terminal system according to claim 16, wherein said terminal communication means operates to communicate ID data and terminal data to said host computer system and receive terminal release authorization from said host computer system.

19. A customer information terminal system according to claim 17, wherein said system further comprises in the central docking area:

means for receiving a release signal from said customer information terminal and releasing said customer information terminal in response thereto.

20. A customer information terminal system according to claim 18, wherein said system further comprises in the central docking area:

means for receiving a release signal from said customer information terminal and releasing said customer information terminal in response thereto.

21. A customer information terminal system according to claim 13, wherein said customer shopping data includes data files having data indicating at least one of items selected for purchase by a customer and data indicating items desired to be purchased by the customer.

22. A customer information terminal system according to claim 14, wherein said customer shopping data includes data files having data indicating at least one of items selected for purchase by a customer and data indicating items desired to be purchased by the customer.

23. A customer information terminal system according to claim 17, wherein said customer shopping data includes data files having data indicating at least one of items selected for purchase by a customer and data indicating items desired to be purchased by the customer.

24. A customer information terminal system according to claim 18, wherein said customer shopping data includes data files having data indicating at least one of items selected for purchase by a customer and data indicating items desired to be purchased by the customer.

25. A customer information terminal system according to claim 21, wherein said dataform communicated to said host computer system by the customer information terminal associated with a customer is used to modify said customer shopping data associated with the customer.

26. A customer information terminal system according to claim 22, wherein said dataform data communicated to said host computer system by the customer information terminal associated with a customer is used to modify said customer shopping data associated with the customer.

27. A customer information terminal system according to claim 23, wherein said dataform data communicated to said host computer system by the customer information terminal associated with a customer is used to modify said customer shopping data associated with the customer.

28. A customer information terminal system according to claim 24, wherein said dataform data communicated to said host computer system by the customer information terminal associated with a customer is used to modify said customer shopping data associated with the customer.

29. A customer information terminal system according to claim 25, wherein said host computer system communicates advertising data to said customer information terminal for a customer viewing said respective display means, the advertising data being communicated in response to a dataform being communicated to said host computer system by said customer information terminal.

30. A customer information terminal system according to claim 26, wherein said host computer system communicates advertising data to said customer information terminal for a customer viewing said respective display means, the advertising data being communicated in response to a dataform being communicated to said host computer system by said customer information terminal.

31. A customer information terminal system according to claim 27, wherein said host computer system communicates advertising data to said customer information terminal for a customer viewing said respective display means, the advertising data being communicated in response to a dataform being communicated to said host computer system by said customer information terminal.

32. A customer information terminal system according to claim 28, wherein said host computer system communicates advertising data to said customer information terminal for a customer viewing said respective display means, the advertising data being communicated in response to a dataform being communicated to said host computer system by said customer information terminal.

33. A customer information terminal system according to claim 21, wherein said host computer system includes TCP/IP communications means for communicating data with a customer information terminal in a customer's home, the data being used to modify said customer shopping data.

34. A customer information terminal system according to claim 22, wherein said host computer system includes TCP/IP communications means for communicating data with a customer information terminal in a customer's home, the data being used to modify said customer shopping data.

35. A customer information terminal system according to claim 23, wherein said host computer system includes TCP/IP communications means for communicating data with a customer information terminal in a customer's home, the data being used to modify said customer shopping data.

36. A customer information terminal system according to claim 24, wherein said host computer system includes TCP/IP communications means for communicating data with a customer information terminal in a customer's home, the data being used to modify said customer shopping data.

37. A customer information terminal system according to claim 10, wherein said host computer system includes a customer preference file having data used to set operating parameters of a respective customer information terminal.

38. A customer information terminal system according to claim 1, wherein said host computer system includes a customer preference file having data used to set operating parameters of a respective customer information terminal.

39. A customer information terminal system, comprising:
(a) a host computer system having memory means for storing customer shopping data for a plurality of customers;
(b) a customer information terminal including:
dataform reader means adapted for reading and decoding a dataform,
input means adapted for inputting data to the customer information terminal,
terminal communication means adapted for communicating data between the customer information terminal and the host computer system,
display means adapted for displaying data,
power supply means adapted for supplying power to the customer information terminal, and
coupling means adapted for coupling the customer information terminal to a docking means;
(c) at least one docking means adapted for supporting a customer information terminal, the at least one docking means located in a central docking area; and (d) at least one cart means, wherein each said cart means includes a support means for supporting a customer information terminal, wherein said support means comprises:
docking means adapted for receiving a customer information terminal and having at least two degrees of movement; and
mounting means adapted for mounting the docking means to a docking structure, said mounting means having an adjustable length and including:
first and second rod means, wherein said first rod means is fixed to said docking structure, and said second rod means is movable relative to said first rod means to adjust the length of said mounting means, and
locking means for fixing the position of said second rod means relative to said first rod means.

40. A customer information terminal system comprising:
a dataform reader adapted for reading and decoding a dataform,
an input device adapted for inputting data to the customer information terminal,
a communication device adapted for communicating data between the customer information terminal and an associated host computer system,
a display adapted for displaying data,
a power supply adapted for supplying power to the customer information terminal, and
a coupling device adapted for coupling the customer information terminal to an associated docking station, wherein said associated docking station is adapted for supporting the customer information terminal, the at least one docking means located in a central docking area; and
at least one cart means, wherein each said cart means includes a support means for supporting a customer information terminal, wherein said support means comprises:
first means adapted for receiving a customer information terminal; and
mounting means adapted for mounting the first means to a support structure, said mounting means adapted to hang from the support structure, and including slot means for receiving a portion of the support structure, wherein said slot means includes:
first and second wall means for gripping said support structure, and
bias means for biasing the second wall means towards said first wall means.

41. A customer information terminal system comprising:
(a) a customer information terminal including:
a dataform reader adapted for reading and decoding a dataform,
an input device adapted for inputting data to the customer information terminal,
a transceiver system for communicating data between the customer information terminal and an associated host computer system, said host computer system including a storage device for storing customer shopping data for one or more customers,
a display unit adapted for displaying data, and
a power supply adapted for supplying power to the customer information terminal; and
(b) support means for supporting a customer information terminal on an associated cart having a support structure, said support means including docking means adapted for receiving the customer information terminal.

42. A customer information terminal system according to claim 41, wherein the height of said docking means is adjustable.

43. A customer information terminal system according to claim 42, wherein said support means is connected with telescoping rod means for adjusting the height of said docking means.

44. A customer information terminal system comprising:
(a) a customer information terminal including:
a dataform reader adapted for reading and decoding a dataform,
an input device adapted for inputting data to the customer information terminal,
a transceiver system for communicating data between the customer information terminal and an associated host computer system, said host computer system including a storage device for storing customer shopping data for one or more customers, a display unit adapted for displaying data, and a power supply adapted for supplying power to the customer information terminal; and (b) support means for supporting a customer information terminal on an associated cart having a support structure.

45. A customer information terminal system according to claim 44, wherein said support means includes:

first and second gripping means for gripping said support structure, and bias means for biasing at least one of said first and second gripping means.

46. A customer information terminal system according to claim 45, wherein said bias means biases said second gripping means toward said first gripping means.

47. A customer information terminal system according to claim 44, wherein said support means includes a cradle for receiving said customer information terminal.

48. A customer information terminal system according to claim 44, wherein said support means is integral with said customer information terminal.

* * * * *